(12) United States Patent
Jesudason et al.

(10) Patent No.: US 8,655,277 B2
(45) Date of Patent: Feb. 18, 2014

(54) WORKSPACE ENERGY MANAGEMENT USING MULTIFACTOR PRESENCE DETECTION AND MOBILE PHONE IDENTITY VERIFICATION

(75) Inventors: Basil Isaiah Jesudason, Portland, OR (US); Craig Thompson Whittle, Vancouver, WA (US); Mary Louise Bourret, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 186 days.

(21) Appl. No.: 13/134,095

(22) Filed: May 27, 2011

(65) Prior Publication Data

US 2012/0302226 A1 Nov. 29, 2012

(51) Int. Cl.
*H04B 7/00* (2006.01)

(52) U.S. Cl.
USPC ...... 455/41.2; 455/41.1; 455/420; 340/686.6; 700/302; 713/320

(58) Field of Classification Search
USPC .............. 340/686.6; 455/41.2, 41.3, 420; 700/302; 713/320
See application file for complete search history.

(56) References Cited

U.S. PATENT DOCUMENTS

| | | | |
|---|---|---|---|
| 2,969,530 A * | 1/1961 | Duncan | 381/56 |
| 5,030,941 A | 7/1991 | Lizzi et al. | 340/572 |
| 6,548,967 B1 * | 4/2003 | Dowling et al. | 315/318 |
| 7,531,921 B2 * | 5/2009 | Cencur | 307/126 |
| 7,715,276 B2 | 5/2010 | Agam et al. | 367/96 |
| 2005/0185398 A1 * | 8/2005 | Scannell | 362/227 |
| 2010/0328076 A1 * | 12/2010 | Kyle et al. | 340/573.1 |
| 2012/0161927 A1 * | 6/2012 | Pierfelice et al. | 340/5.83 |

FOREIGN PATENT DOCUMENTS

WO WO2007022111 2/2007 ............. G07C 9/00

* cited by examiner

*Primary Examiner* — April G Gonzales
(74) *Attorney, Agent, or Firm* — Scot A. Reader

(57) ABSTRACT

A workspace energy management method and system control the power state of workspace appliances using multi-factor presence detection and mobile phone identity verification. Multifactor presence detection substantially reduces the risk that workspace appliances will be powered-up in response to erroneous detection of presence at the workspace (e.g., false positive). Mobile phone identity verification, which verifies that the office worker's mobile phone is at the workspace (and thus that the office worker is also likely at the workspace) before workspace appliances are powered-up, prevents workspace appliances from being inadvertently powered-up by personnel other than the office worker, but without compromising worker privacy.

17 Claims, 3 Drawing Sheets

WORKSPACE ENERGY MANAGEMENT USING MULTIFACTOR PRESENCE DETECTION AND MOBILE PHONE IDENTITY VERIFICATION

BACKGROUND OF THE INVENTION

The present invention relates to energy conservation in the workplace and, more particularly, to automated methods and systems for adjusting the power state of workspace appliances.

One of the objectives of an eco-friendly office is to only have workspace appliances (e.g., lights, computers, fans, etc.) fully powered when the office worker is at his or her workspace. One way to achieve this eco-friendly objective is to have the office worker manually power-down workspace appliances upon leaving the workspace and power-up workspace appliances upon returning to the workspace. Unfortunately, many office workers at least occasionally forget or don't bother to manually power-down their workspace appliances upon leaving their workspaces, resulting in large amounts of energy being wasted.

Another way to make progress toward this eco-friendly objective is to install presence sensors at the workspace. When the office worker leaves the workspace, his or her presence is not detected and workspace appliances are powered-down. When the office worker returns to the workspace, his or her presence is detected and workspace appliances are powered-up. Unfortunately, presence sensors are sometimes prone to false positives that cause workspace appliances to be powered-up even though no one has reentered the workspace. Moreover, most presence sensors do not verify the identity of the person who has entered the workspace. Accordingly, a cleaning person or maintenance worker who enters the workspace may inadvertently cause workspace appliances to be powered-up when the office worker is not there. False positives and lack of identity verification can once again waste large amounts of energy.

Video cameras and image processing equipment could be implemented along with presence sensors to verify that the person who has entered the workspace is the office worker before powering-up workspace appliances. However, installation of video cameras and image processing equipment adds meaningfully to system cost. Moreover, office workers may perceive video cameras at their workspaces as invasive of their privacy, which can adversely impact worker morale.

SUMMARY OF THE INVENTION

The present invention provides a workspace energy management method and system that controls the power state of workspace appliances using multi-factor presence detection and mobile phone identity verification. Multifactor presence detection substantially reduces the risk that workspace appliances will be powered-up in response to erroneous detection of presence at the workspace (e.g., false positive). Mobile phone identity verification, which verifies that the office worker's mobile phone is at the workspace (and thus that the office worker is also likely at the workspace) before workspace appliances are powered-up, prevents workspace appliances from being inadvertently powered-up by personnel other than the office worker, but without compromising worker privacy.

In one aspect of the invention, a workspace energy management system comprises one or more sensors and one or more control units, wherein at least one of the sensors receives first data from which at least one of the control units detects presence of a person based on a first presence factor, wherein at least one of the sensors receives second data from which at least one of the control units detects presence of the person based on a second presence factor, wherein at least one of the sensors receives a mobile phone identifier from which at least one of the control units determines an identity of the person, and wherein at least one of the control units adjusts a power state of one or more appliances based on the multifactor presence detection and identification of the person.

In some embodiments, at least one of the sensors is an ultrasonic sensor and one of the presence factors is a distance determined using data captured by the ultrasonic sensor.

In some embodiments, at least one of the sensors is a sound sensor and one of the presence factors is a noise level determined using data captured by the sound sensor.

In some embodiments, at least one of the sensors is a sound sensor and one of the presence factors is a sound pattern determined using data captured by the sound sensor.

In some embodiments, at least one of the sensors is a wireless networking sensor and one of the presence factors is a signal strength determined using data received by the wireless networking sensor.

In some embodiments, the wireless networking sensor is a Bluetooth sensor.

In some embodiments, the mobile phone identifier is a media access control (MAC) address.

In some embodiments, the one or more appliances are office appliances.

In some embodiments, the one or more control units comprise a sensor control unit and an energy control unit.

In another aspect of the invention, a workspace energy management method comprises the steps of receiving by a sensor of an energy management system first data; detecting by the system presence of a person using the first data based on a first presence factor; receiving by a sensor of the system second data; detecting by the system presence of the person using the second data based on a second presence factor; receiving by a sensor of the system a mobile phone identifier; determining by the system an identity of the person using the mobile phone identifier; and adjusting by the system a power state of at least one appliance based on the multifactor presence detection and identification of the person.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
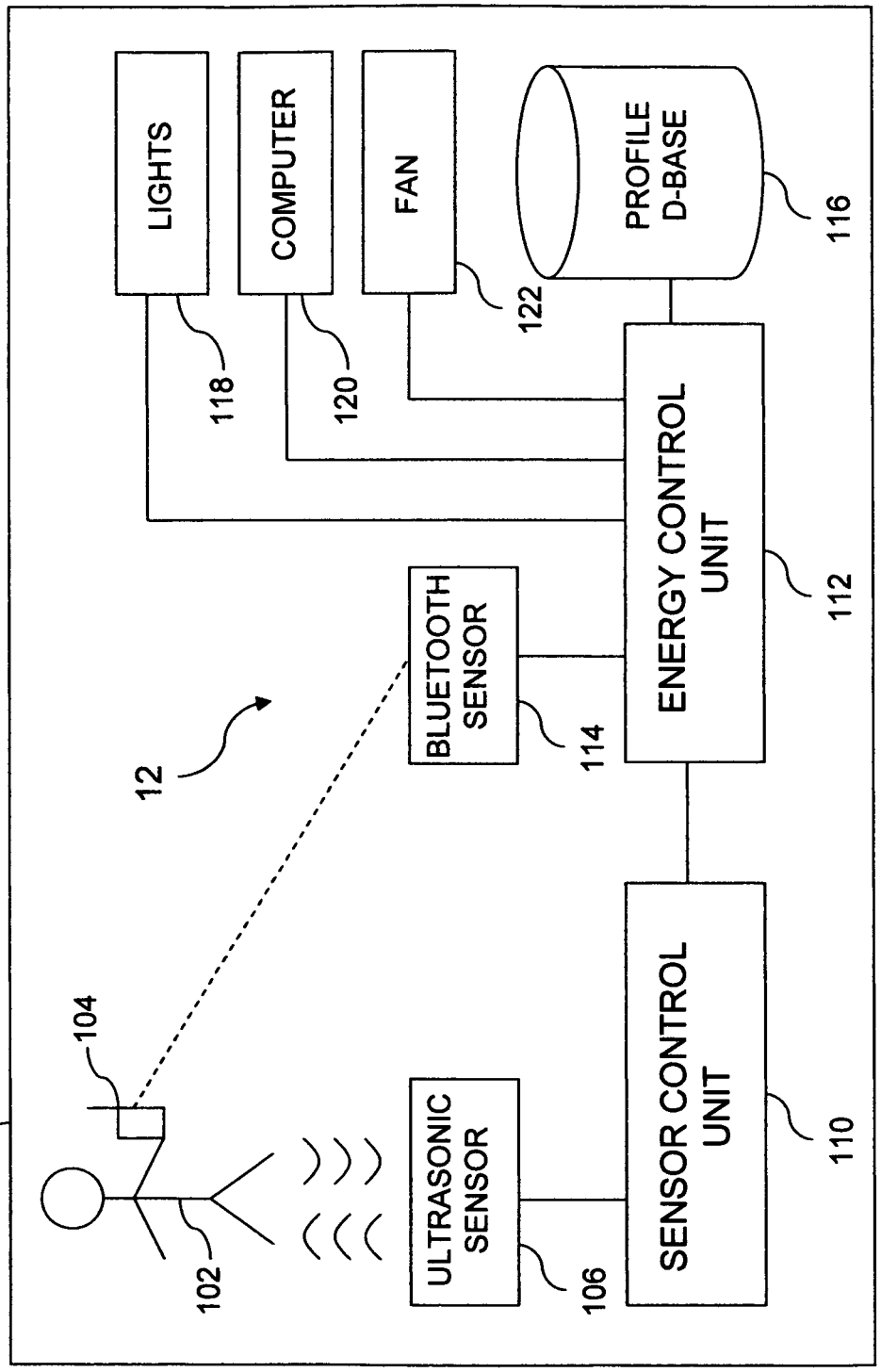
FIG. 1 shows a workspace energy management system in some embodiments of the invention.

FIG. 1 shows a workspace energy management system 12 in some embodiments of the invention. Management system 12 is installed and operative at a workspace 10 of an office worker who carries a Bluetooth-enabled mobile phone. Workspace 10 may be a room or cubicle within a commercial office building, or a home office, by way of example.

Management system 12 has a sensor control unit 110 communicatively coupled between an ultrasonic sensor 106 and an energy control unit 112. Once every second, sensor control unit 110 sends to ultrasonic sensor 106 a pulse causing ultrasonic sensor 106 to output into free space a short ultrasonic ping (e.g., 50 kHz tone) via its speaker. When ultrasonic sensor 106 outputs the ultrasonic ping, ultrasonic sensor 106 raises a low signal sent to sensor control unit 110 to a high signal and waits for an echo from the ultrasonic ping to be received via its microphone. When ultrasonic sensor 106 receives the echo, ultrasonic sensor 106 lowers the high signal sent to sensor control unit 110 back to a low signal. Sensor control unit 110 records the high signal time and uses the high signal time and the speed of sound in air to compute the distance of the object that reflected the ultrasonic ping. Sensor control unit 110 detects that a person 102 has entered workspace 10 when the computed distance is below a predetermined threshold. Upon detecting that person 102 has entered workspace 10, sensor control unit 110 sends a presence notification to energy control unit 112 (e.g., via ZigBee).

Management system 12 also has a Bluetooth sensor 114 communicatively coupled with energy control unit 112 (e.g., via a Universal Serial Bus connection). When a mobile phone 104 carried by person 102 comes in range of Bluetooth sensor 114, Bluetooth sensor 114 automatically establishes communication with mobile phone 104 and acquires the MAC address of mobile phone 104. Bluetooth sensor 114 also acquires from mobile phone 104 or computes a received signal strength indication (RSSI) for the Bluetooth communication. Upon receiving the presence notification from sensor control unit 110 indicating that person 102 has entered workspace 10, energy control unit 112 acquires from Bluetooth sensor 114 the MAC address and RSSI. Energy control unit 112 uses the RSSI to compute the distance of mobile phone 104 from energy control unit 112 and confirms that person 102 has entered workspace 10 when the computed distance is below a predetermined threshold.

Upon confirming that person 102 has entered workspace 10, energy control unit 112 looks-up the MAC address acquired from mobile phone 104 to determine whether or not person 102 is the office worker. The MAC address acquired from mobile phone 104 is compared with a known MAC address of the office worker's mobile phone, which may be stored on Bluetooth sensor 114, energy control unit 112 or in a profile database 116. Upon finding a MAC address match, energy control unit 112 determines that person 102 who has entered workspace 10 is the office worker.

At this point, management system 12 has detected the presence of person 102 at workspace 10 based on a first presence factor (e.g., a distance determined using data captured by ultrasonic sensor 106) and confirmed the presence of person 102 at workspace 10 based on a second presence factor (e.g., a signal strength determined using data received by Bluetooth sensor 114). Management system 12 has also verified that person 102 is the office worker. Accordingly, energy control unit 112 retrieves the office worker's energy profile from profile database 116 and adjusts the power state of one or more workspace appliances 118, 120, 122 based on the energy profile. Energy control unit 112 may access the office worker's energy profile using the MAC address of the office worker's mobile phone or another lookup key associated with the office worker. The office worker's energy profile may instruct to turn-on one or more of lights 118, computer 120 or fan 122 and energy control unit may turn-on one or more of lights 118, computer 120 or fan 122 in response to the instruction.

Figure 3:
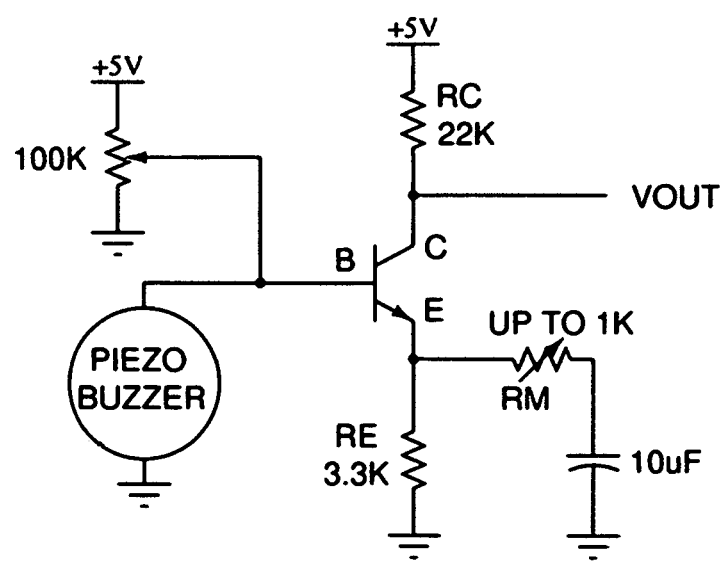
FIG. 3 shows an exemplary circuit for a sound sensor in some embodiments of the invention.

In some embodiments, an additional or different presence sensor is used to detect presence of a person at a workspace. In one example, in lieu of or in addition to an ultrasonic sensor, a sound sensor may be communicatively coupled with a sensor control unit. The sound sensor has a microphone or buzzer that samples sound at the workspace and relays the samples to the sensor control unit. The sensor control unit computes an average noise level from the samples and compares the average noise level to a predetermined noise threshold that is indicative of the noise level when the workspace is in use. The sensor control unit detects that a person has entered the workspace when the average noise level is above the predetermined noise threshold. Alternatively, the sensor control unit may compare a sound pattern in the samples to a prerecorded sound pattern that is indicative of sound at the workspace when in use. The sensor control unit detects that a person has entered the workspace when the sound pattern in the samples is a close match with the prerecorded sound pattern. Upon detecting that a person has entered the workspace based on either the noise level or sound pattern, the sensor control unit sends a presence notification to the energy control unit. FIG. 3 shows an exemplary circuit for a sound sensor in some embodiments of the invention.

Moreover, in some embodiments, a different wireless networking sensor is used to communicate with the mobile phone, acquire the MAC address of the mobile phone and the RSSI and verify the identity of a person at a workspace.

Moreover, in some embodiments, the presence sensor and the wireless networking sensor are communicatively coupled to the same control unit, which may be a sensor control unit, an energy control unit, or an integrated sensor and energy control unit. For example, in one exemplary arrangement, sensor control units each having their own presence and wireless networking sensors are installed at different workspaces throughout a commercial office building and are communicatively coupled to a central energy control unit that is responsible for controlling the power state of all appliances at the different workspaces. Notably, in embodiments of the workspace energy management system that invoke a central energy control unit, some of the system components (namely, the energy control unit and possibly the profile database) are not installed at the workspace.

Figure 2:
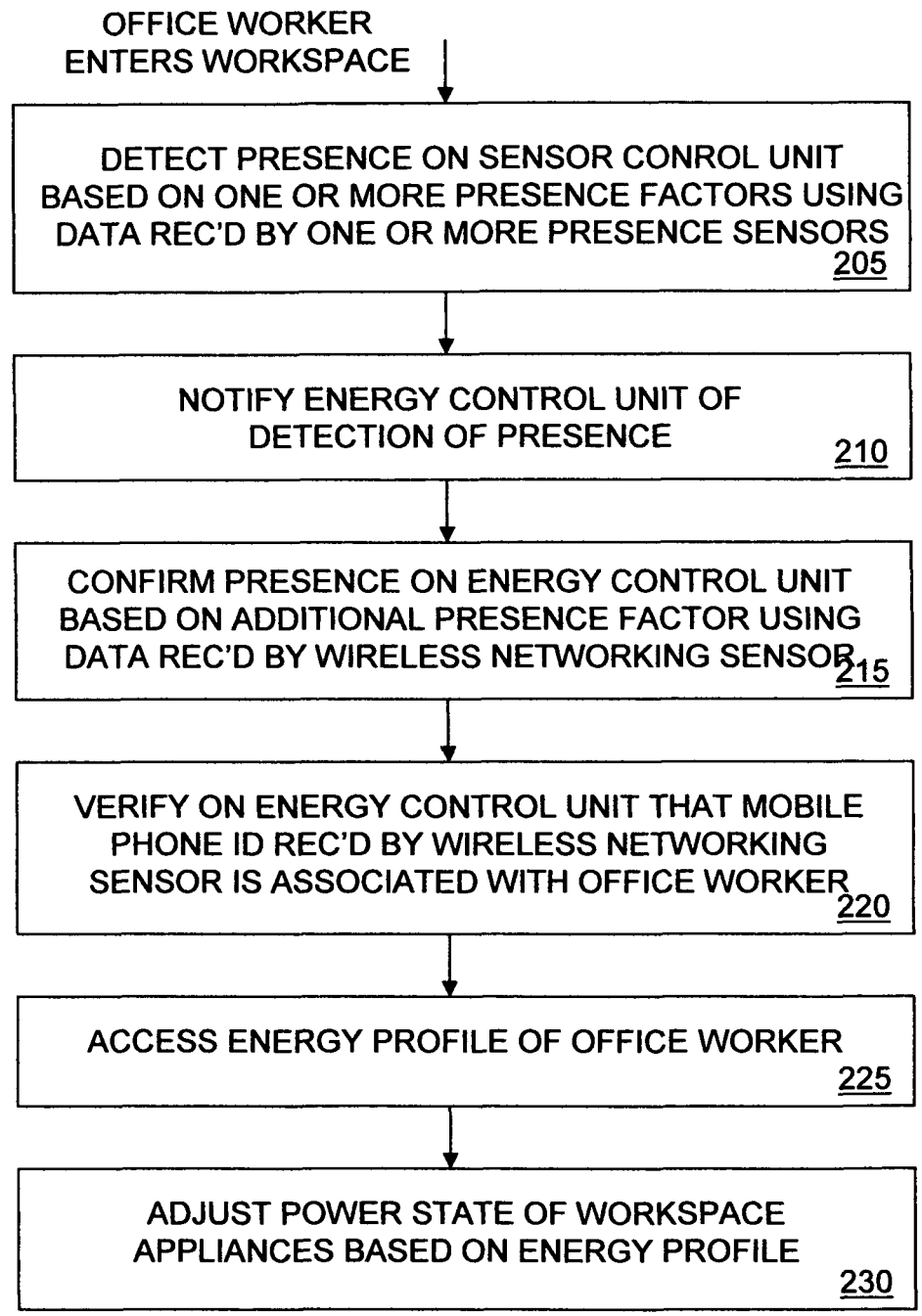
FIG. 2 shows a workspace energy management method performed by a workspace energy management system in some embodiments of the invention.

FIG. 2 shows a an energy management method performed by an energy management system in some embodiments of the invention. An office worker enters his or her workspace and presence of a person at the workspace is detected by a sensor control unit based on one or more presence factors using data received by one or more presence sensors (e.g., a distance determined using data captured by an ultrasonic sensor, a noise level determined using data captured by the sound sensor, etc.) (205). Upon detecting presence of the person, the sensor control unit sends a presence notification to an energy control unit (210). The energy control unit confirms presence of the person based on one more additional presence factors using data received by a wireless networking sensor (e.g., a signal strength determined using data received by a Bluetooth sensor) (215). The energy control unit also verifies that a mobile phone identifier (e.g. MAC address) received by the wireless networking sensor from a mobile phone carried by the person is the office worker's mobile phone (e.g., matches a prestored MAC address of the office worker's mobile phone) (220). Upon successful verification, the energy control unit accesses the office worker's energy profile from a profile database (225) and adjusts the power state of one or more appliances based on instructions in the energy profile (230).

Sensors and control units perform functions attributed to sensors and control units herein using microprocessors executing software instructions, microcontrollers, custom circuitry or a combination thereof. Moreover, sensors and control units have internal memory elements for storing data, identifiers and thresholds indicated herein to be acquired, manipulated, compared or sent.

It will be appreciated by those of ordinary skill in the art that the invention can be embodied in other specific forms without departing from the spirit or essential character hereof. The present description is thus considered in all respects to be illustrative and not restrictive. The scope of the invention is indicated by the appended claims, and all changes that come with in the meaning and range of equivalents thereof are intended to be embraced therein.

What is claimed is:

1. A workspace energy management system, comprising:
    one or more sensors at a workspace; and
    one or more control units at the workspace, wherein at least one of the sensors is configured to receive first data from which at least one of the control units is configured to detect presence of a person at the workspace based on a first presence factor, wherein at least one of the sensors is configured to receive second data from which at least one of the control units is configured to confirm presence of the person at the workspace based on a second presence factor, wherein at least one of the sensors is configured to receive an identifier of a mobile phone at the workspace which at least one of the control units is configured to verify is associated with an office worker to whom the workspace belongs, and wherein at least one of the control units is configured after confirmation of presence of the person at the workspace and verification of the mobile phone identifier associated with the office worker to consult an energy profile for the office worker to obtain instruction on how to adjust a power state of one or more appliances at the workspace and adjust a power state of at least one of the appliances in accordance with the instruction.

2. The system of claim 1, wherein at least one of the sensors is an ultrasonic sensor and one of the presence factors is a distance determined using data captured by the ultrasonic sensor.

3. The system of claim 1, wherein at least one of the sensors is a sound sensor and one of the presence factors is a noise level determined using data captured by the sound sensor.

4. The system of claim 1, wherein at least one of the sensors is a sound sensor and one of the presence factors is a sound pattern determined using data captured by the sound sensor.

5. The system of claim 1, wherein at least one of the sensors is a wireless networking sensor and one of the presence factors is a signal strength determined using data received by the wireless networking sensor.

6. The system of claim 5, wherein the wireless networking sensor is a Bluetooth sensor.

7. The system of claim 1, wherein the mobile phone identifier is a media access control (MAC) address.

8. The system of claim 1, wherein the one or more appliances are office appliances.

9. The system of claim 1, wherein the one or more control units comprise a sensor control unit and an energy control unit.

10. A workspace energy management method, comprising the steps of:
    receiving by a sensor of an energy management system at a workspace first data;
    detecting by the system presence of a person at the workspace using the first data based on a first presence factor;
    receiving by a sensor of the system at the workspace second data;
    confirming by the system presence of the person at the workspace using the second data based on a second presence factor;
    receiving by a sensor of the system at the workspace an identifier of a mobile phone at the workspace;
    verifying by the system that the received mobile phone identifier is associated an office worker to whom the workspace belongs;
    consulting by the system an energy profile for the office worker to obtain instruction on how to adjust a power state of one or more appliances at the workspace; and
    adjusting by the system a power state of at least one appliance in accordance with the instruction.

11. The method of claim 10, wherein at least one of the sensors is an ultrasonic sensor and one of the presence factors is a distance determined using data captured by the ultrasonic sensor.

12. The method of claim 10, wherein at least one of the sensors is a sound sensor and one of the presence factors is a noise level determined using data captured by the sound sensor.

13. The method of claim 10, wherein at least one of the sensors is a sound sensor and one of the presence factors is a sound pattern determined using data captured by the sound sensor.

14. The method of claim 10, wherein at least one of the sensors is a wireless networking sensor and one of the presence factors is a signal strength determined using data received by the wireless networking sensor.

15. The method of claim 14, wherein the wireless networking sensor is a Bluetooth sensor.

16. The method of claim 10, wherein the mobile phone identifier is a MAC address.

17. The method of claim 10, wherein the one or more appliances are office appliances.

* * * * *

UNITED STATES PATENT AND TRADEMARK OFFICE
CERTIFICATE OF CORRECTION

PATENT NO. : 8,655,277 B2
APPLICATION NO. : 13/134095
DATED : February 18, 2014
INVENTOR(S) : Basil Isaiah Jesudason et al.

Page 1 of 1

It is certified that error appears in the above-identified patent and that said Letters Patent is hereby corrected as shown below:

In the Claims

In claim 10, at column 6, line 24, "associated an" is replaced with --associated with an--.

Signed and Sealed this
Twenty-second Day of April, 2014

Michelle K. Lee
*Deputy Director of the United States Patent and Trademark Office*